United States Patent
Niwa et al.

(10) Patent No.: US 8,821,225 B2
(45) Date of Patent: Sep. 2, 2014

(54) VEHICLE INSTRUMENT PANEL

(75) Inventors: Takashi Niwa, Nagoya (JP); Yasunobu Yamazaki, Okazaki (JP); Toru Kondo, Toyoake (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 157 days.

(21) Appl. No.: 13/635,767

(22) PCT Filed: Mar. 19, 2010

(86) PCT No.: PCT/JP2010/054856
§ 371 (c)(1),
(2), (4) Date: Sep. 18, 2012

(87) PCT Pub. No.: WO2011/114521
PCT Pub. Date: Sep. 22, 2011

(65) Prior Publication Data
US 2013/0023192 A1 Jan. 24, 2013

(51) Int. Cl.
*B60S 1/54* (2006.01)
*B60H 1/00* (2006.01)
*B60H 1/26* (2006.01)
*B62D 25/14* (2006.01)

(52) U.S. Cl.
USPC ............... 454/127; 165/42; 165/43; 165/204; 454/143; 296/208

(58) Field of Classification Search
CPC ........ B60H 1/00; B60H 1/0055; B60K 37/00; B62D 25/142
USPC ....................................................... 454/127
See application file for complete search history.

(56) References Cited

U.S. PATENT DOCUMENTS 4,223,754 A * 9/1980 Mizuno et al. ................... 180/90
4,766,805 A * 8/1988 Sato et al. ...................... 454/127

(Continued)

FOREIGN PATENT DOCUMENTS

| JP | 7-52683 | 2/1995 |
| JP | 8-80762 | 3/1996 |

(Continued)

OTHER PUBLICATIONS

International Search Report in International Application No. PCT/JP2010/054856; Mailing Date: Apr. 13, 2010.

*Primary Examiner* — Steven B McAllister
*Assistant Examiner* — Helena Kosanovic
(74) *Attorney, Agent, or Firm* — Finnegan, Henderson, Farabow, Garrett & Dunner LLP

(57) ABSTRACT

Condensation is suppressed from developing on a front face of an instrument panel main body. A instrument panel of the present invention is configured including: an instrument panel main body formed with a center air conditioning outlet and a center defroster outlet; a first panel that is joined to the instrument panel main body and is formed with a top side wall section that configures the vehicle top-bottom direction top side of a center air conditioning duct and a first wall section that configures part of a center defroster duct; and a second panel that is joined to the instrument panel main body and is formed with a bottom side wall section that configures the center air conditioning duct in combination with the top side wall section and a second wall section that configures the center defroster duct in combination with the first wall section.

5 Claims, 13 Drawing Sheets

(56) References Cited

U.S. PATENT DOCUMENTS

| | | | |
|---|---|---|---|
| 5,762,395 A * | 6/1998 | Merrifield et al. | 296/203.01 |
| 6,110,037 A * | 8/2000 | Yoshinaka | 454/143 |
| 6,409,590 B1 | 6/2002 | Suzuki et al. | |
| 8,376,445 B2 * | 2/2013 | Yamazaki | 296/70 |
| 2002/0145309 A1 | 10/2002 | Shikata et al. | |
| 2004/0102152 A1 | 5/2004 | Kawahigashi | |

FOREIGN PATENT DOCUMENTS

| | | |
|---|---|---|
| JP | 8-268041 | 10/1996 |
| JP | 10-250414 | 9/1998 |
| JP | 2002-87045 | 3/2002 |
| JP | 2002-87114 | 3/2002 |
| JP | 2002-144847 | 5/2002 |
| JP | 2004-299480 | 10/2004 |
| JP | 2010-6357 | 1/2010 |

* cited by examiner

VEHICLE INSTRUMENT PANEL

CROSS-REFERENCE TO RELATED APPLICATIONS

This application is a national phase application of International Application No. PCT/JP2010/054856, filed Mar. 19, 2010, the content of which is incorporated herein by reference.

TECHNICAL FIELD

The present invention relates to a vehicle instrument panel.

BACKGROUND ART

Known vehicle instrument panels are disclosed for example in following documents such as Japanese Patent Application Laid-Open (JP-A) No. 10-250414, JP-A No. 8-268041, JP-A No. 7-52683, JP-A No. 8-80762, JP-A No. 2002-87114, and JP-A No. 2004-299480. In an example described in JP-A No. 10-250414, a first panel member and a second panel member are disposed at the back side of an instrument panel member. The first panel member and the second panel member configure a nozzle section that is in communication with a defroster outlet formed in the instrument panel member. The first panel member, in combination with the instrument panel member, configures a duct that is in communication with an outlet member provided to the instrument panel member.

SUMMARY OF INVENTION

Technical Subject

However, in the example of JP-A No. 10-250414, the instrument panel member configures part of a duct that is in communication with the outlet member. There is therefore concern of condensation developing on a front face of the instrument panel member when cooled air passes through inside the duct.

In consideration of the above circumstances, the present invention is directed towards providing a vehicle instrument panel capable of suppressing condensation from developing on the front face of an instrument panel main body.

Solution to Subject

In order to address the above subject, a vehicle instrument panel of the present invention includes: an instrument panel main body that covers a vehicle structural body including an air conditioner device from the vehicle top-bottom direction top side, and is formed with an air conditioning outlet and a defroster outlet; a first panel disposed at the vehicle top-bottom direction bottom side of the instrument panel main body, joined to the instrument panel main body, and formed with a top side wall section that configures a vehicle top-bottom direction top side of an air conditioning duct that communicates an air feed outlet of the air conditioner device with the air conditioning outlet and a first wall section that configures part of a center defroster duct that communicates the air feed outlet of the air conditioner device with the defroster outlet; and a second panel disposed at the vehicle top-bottom direction bottom side of the first panel, joined to the instrument panel main body, and formed with a bottom side wall section that configures the air conditioning duct in combination with the top side wall section and a second wall section that configures the defroster duct in combination with the first wall section.

In this vehicle instrument panel, a conditioned air is fed from the air feed outlet of the air conditioner device to the air conditioning duct, and the conditioned air is guided along the air conditioning duct to the air conditioning outlet, where the conditioned air is blown out from the air conditioning outlet into the vehicle interior.

The vehicle top-bottom direction top side of the air conditioning duct is configured by the top side wall section of the first panel. Consequently, condensation can be suppressed from developing on a front face of the instrument panel main body corresponding to the air conditioning duct even when the conditioned air referred to above is cooled air, since the cooled air does not make direct contact with the back face of the instrument panel main body.

Preferably the vehicle instrument panel of the present invention is configured such that: a reinforcement section is formed at at least one of the first panel and the second panel, the reinforcement section including plural protruding portions forming respective protrusions on the instrument panel main body side and including load bearing faces on the respective leading ends, and a connecting portion that connects bottom end sides of the plural protruding portions. And the load bearing faces of some of the plural protruding portions are joined to the back face of the instrument panel main body.

According to the vehicle instrument panel, the rigidity of the instrument panel main body is raised by the closed cross-section formed between the plural protruding portions joined to the back face of the instrument panel main body, enabling the instrument panel main body to be suppressed from deforming more than necessary even when a load or impact is applied to the instrument panel main body.

When a load or impact is applied to the instrument panel main body, the load or impact is borne by the load bearing face of each of the protruding portions, stress is dispersed by each of the load bearing faces, thereby suppressing stress from being concentrated at a particular portion of the instrument panel main body. Therefore breakage of the instrument panel main body can be suppressed even when a load or impact is applied to the instrument panel main body.

Adopting a structure in which the instrument panel main body is reinforced in this manner enables the wall thickness of the instrument panel main body to be made thinner, and enables reductions in weight and cost to be achieved.

Preferably configuration is made with the plural protruding portions arrayed such that there is no un-bent line portions present between a first group of protruding portions and a second group of protruding portions that are disposed alongside each other, or are formed so as to be mutually connected together in an overall honeycomb pattern.

Adopting such a configuration suppresses creasing of the reinforcement section, and enables rigidity of the reinforcement section to be secured.

Note that while the reinforcement section may be formed at the top side wall section configuring part of the air conditioning duct, the reinforcement section is more preferably formed at a portion other than at the air conditioning duct or the defroster duct.

Adopting such a configuration enables, for example, limitation to the placement and shape of the air conditioning duct and the defroster duct to be avoided, and impact to the flow of air inside the air conditioning duct and the defroster duct to be avoided.

In such cases, the reinforcement section may be formed contiguous to the first wall section and disposed between the first wall section and the top side wall section, and may be formed to a joint portion at at least one of a right side panel section and a left side panel section of the instrument panel main body.

There is moreover no limitation to forming the reinforcement section to only one of the first panel or the second panel, and configuration may be made with a first reinforcement panel section formed with plural protruding portions formed at the first panel and a second reinforcement panel section serving as a connecting portion formed at the second panel.

Preferably in the vehicle instrument panel of the present invention, a joint portion of the second panel to the instrument panel main body is placed in a superimposed state with a joint portion of the first panel to the instrument panel main body and joined to the back face of the instrument panel main body together with the joint portion of the first panel.

According to the above vehicle instrument panel, the joint portion of the second panel can be joined to the back face of the instrument panel main body together with the joint portion of the first panel in a single process, enabling the assembly processes to be shortened.

Preferably the vehicle instrument panel of the present invention is configured such that side air conditioning outlets and side defroster outlets are formed in a row in the vehicle top-bottom direction at the two vehicle width direction end sides of the instrument panel main body. The second panel is preferably formed with side air conditioning ducts that communicate an air feed outlet of the air conditioner device with the respective side air conditioning outlets, side defroster duct upstream sections that configure the upstream side of side defroster ducts that communicate an air feed outlet of the air conditioner device with the respective side defroster outlets, and side defroster duct downstream sections that are in communication with the respective side defroster duct upstream sections and configure the downstream side of the respective side defroster ducts. The side defroster duct downstream sections are integrally formed at the vehicle width direction outside of the side air conditioning ducts with integral hinges being disposed between the side air conditioning ducts and the side defroster duct downstream sections, the side defroster duct downstream sections are folded back about the integral hinges so as to be superimposed with the side air conditioning ducts. And, in a vehicle top-bottom direction superimposed state with the side air conditioning ducts, the side defroster duct downstream sections are joined together with the side air conditioning ducts to the back face of the instrument panel main body.

According to such a vehicle instrument panel, the side defroster duct downstream sections are folded back about the integral hinges and the side air conditioning ducts and the side defroster ducts are overlapped. There is accordingly no limitation imposed on placement of the side air conditioning outlets and the side defroster outlets, and a structure can be achieved in which the side air conditioning ducts and the side defroster ducts are integrated together with a simple configuration.

Preferably the vehicle instrument panel of the present invention is configured such that side air conditioning outlets and side defroster outlets are formed at the two vehicle width direction end sides of the instrument panel main body, and the second panel is formed with side air conditioning ducts that communicate an air feed outlet of the air conditioner device with the respective side air conditioning outlets and the side defroster ducts that communicate the air feed outlet of the air conditioner device with the side defroster outlets are respectively formed with hat shaped cross-sections open to the instrument panel main body side. The vehicle instrument panel further includes a sheet member that closes off openings at the instrument panel main body side of the side air conditioning ducts and the side defroster ducts.

According to this vehicle instrument panel, the openings at the instrument panel main body side of the side air conditioning ducts and the side defroster ducts are closed off by the sheet member. Consequently, condensation can be suppressed from developing on the front face of the instrument panel main body corresponding to the side air conditioning ducts and the side defroster ducts even when the cooled air passes through inside the side air conditioning ducts and the side defroster ducts, since the cooled air does not make direct contact with the back face of the instrument panel main body.

Preferably the vehicle instrument panel of the present invention is configured such that part of at least one of the first panel and the second panel is formed by vacuum molding.

According to this vehicle instrument panel, since at least part of the first panel and the second panel is formed by vacuum molding, it is possible to make the wall thickness of that portion thinner, enabling further reductions in weight and cost to be achieved.

Preferably the vehicle instrument panel of the present invention is configured such that side air conditioning outlets and side defroster outlets are respectively formed in a row in the vehicle top-bottom direction at the two vehicle width direction end sides of the instrument panel main body. The second panel is formed with side air conditioning ducts that communicate an air feed outlet of the air conditioner device with the respective side air conditioning outlets, and side defroster duct upstream sections that configure the upstream side of side defroster ducts that communicate an air feed outlet of the air conditioner device with the respective side defroster outlets, so as to form hat shaped cross-sections open towards the instrument panel main body side. The first panel is formed with side defroster duct downstream sections configuring the downstream side of the side defroster ducts, the side defroster duct downstream sections are formed by peripheral edge portions of the first panel that extend out and, in a vehicle top-bottom direction superimposed state with the side air conditioning ducts, the side defroster duct downstream sections are joined together with the side air conditioning ducts to the back face of the instrument panel main body.

According to this vehicle instrument panel, the side air conditioning ducts and side defroster duct downstream sections are formed in a row in the vehicle top-bottom direction by the outer peripheral portion that extends out from the first panel. There is accordingly no limitation imposed on placement of the side air conditioning outlets and the side defroster duct outlets, and a structure can be achieved in which the side air conditioning ducts and the side defroster ducts are integrated together with a simple configuration.

The vehicle instrument panel of the present invention is preferably configured such that the first panel is formed with a sheet section that closes off openings on the instrument panel main body side of the side air conditioning ducts and the side defroster duct upstream sections.

According to this vehicle instrument panel, the openings on the instrument panel main body side of the side air conditioning ducts and the side defroster duct upstream sections are closed off by the sheet section. Consequently, condensation can be suppressed from developing on the front face of the instrument panel main body corresponding to the side air conditioning ducts and the side defroster duct upstream sections even when cooled air flows through inside the side air conditioning ducts and the side defroster ducts since the cooled air does not make direct contact with the back face of the instrument panel main body.

The vehicle instrument panel of the present invention is preferably configured such that the side defroster duct downstream sections are formed with hat shaped cross-sections open to the instrument panel main body side, and side defroster duct top side wall sections are integrally formed at the second panel at the vehicle width direction outside of the side air conditioning ducts with integral hinges being disposed between the side air conditioning ducts and the side defroster duct top side wall sections. The side defroster duct top side wall sections are folded back about the integral hinges and, in a vehicle top-bottom direction superimposed state with the side defroster duct downstream sections of the first panel, the side defroster duct top side wall sections are joined to the back face of the instrument panel main body together with the side air conditioning ducts and the side defroster duct downstream sections, closing off openings of the side defroster duct downstream sections on the instrument panel main body side.

According to this vehicle instrument panel, the openings on the instrument panel main body side of the side defroster duct downstream sections are closed off by the side defroster duct top side wall sections. Consequently, condensation can be suppressed from developing on the front face of the instrument panel main body corresponding to the side defroster duct downstream sections even when cooled air flows through inside the side defroster ducts since the cooled air does not make direct contact with the back face of the instrument panel main body.

Advantageous Effects of Invention

As described above, according to the present invention, condensation can be suppressed from developing on the front face of the instrument panel main body.

DESCRIPTION OF EMBODIMENTS

First Exemplary Embodiment

Explanation first follows regarding a first exemplary embodiment of the present invention.

In each of the drawings, an arrow UP, an arrow FR and an arrow OUT respectively indicate a vehicle top-bottom direction top side, a vehicle front-rear direction front side, and a vehicle width direction outside (right side), as appropriate.

Figure 1:
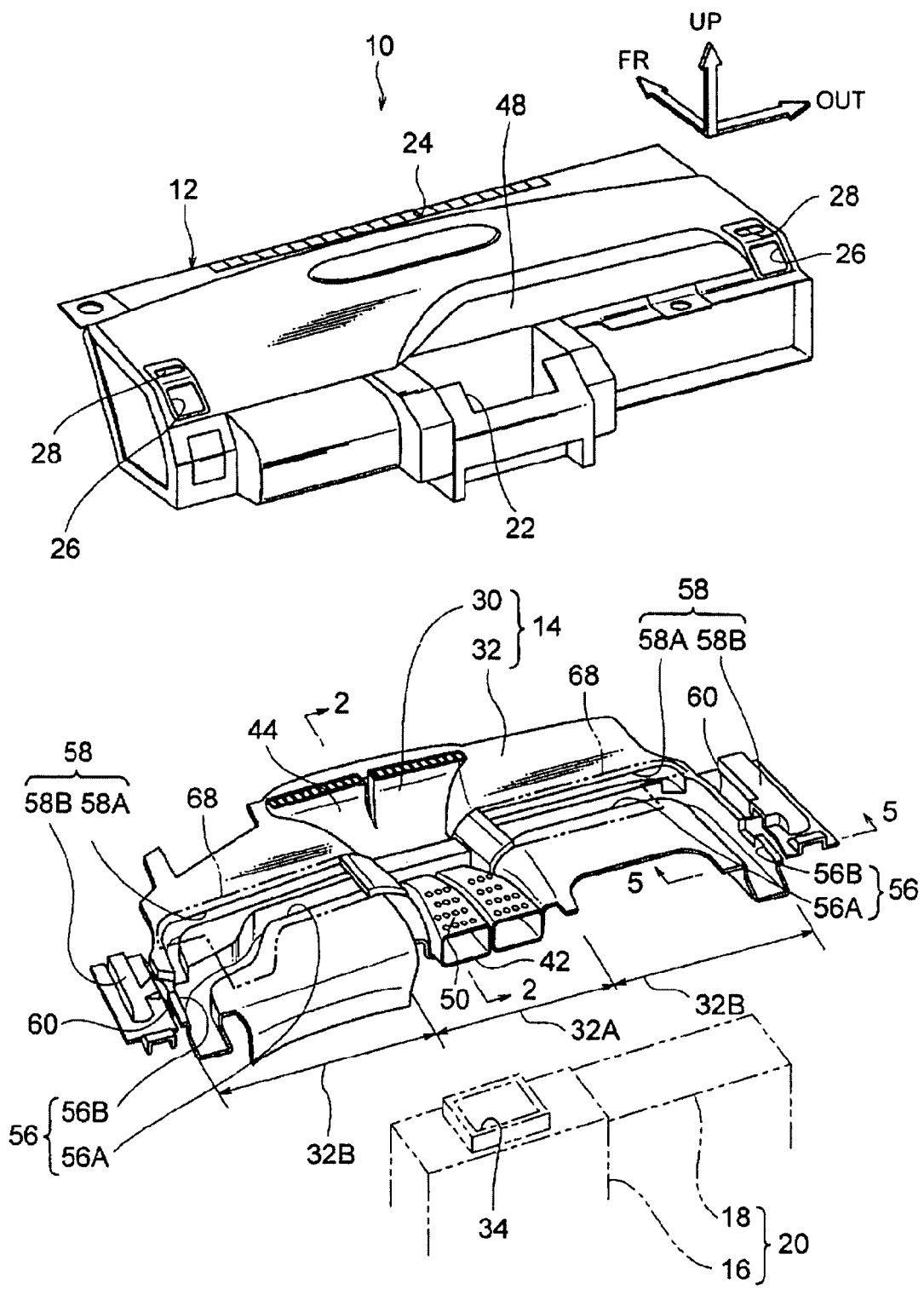
FIG. 1 is an exploded perspective view of an instrument panel according to a first exemplary embodiment of the present invention.

As shown in FIG. 1, an instrument panel 10 serving as a vehicle instrument panel of the first exemplary embodiment of the present invention includes an instrument panel main body 12 and a duct configuring member 14.

The instrument panel main body 12 is manufactured from a resin and is attached to in-panel reinforcement that spans across between left and right front pillars, not shown in the drawings. The instrument panel main body 12 is provided inside a vehicle compartment, and covers a vehicle structural body 20 formed from devices installed to the vehicle, such as an air conditioner 16 and an airbag device 18.

A center air conditioning outlet 22 serving as an air conditioning outlet and a center defroster outlet 24 serving as a defroster outlet are formed at a vehicle width direction central portion of the instrument panel 10 and separated from each other in the vehicle front-rear direction. Side air conditioning outlets 26 and side defroster outlets 28 are formed in a row in the vehicle top-bottom direction at the two respective vehicle width direction end sides of the instrument panel 10.

Note that the instrument panel 10 here is one for a left hand drive vehicle. Namely, the left hand side of the instrument panel 10 is on the driver seat side, and the right hand side is on the passenger seat side.

The duct configuring member 14 is manufactured from a resin and provided between the instrument panel main body 12 and the vehicle structural body 20. The duct configuring member 14 is configured by a first panel 30 and a second panel 32. The first panel 30 is configured smaller in the vehicle width direction than the second panel 32, is provided at the vehicle top-bottom direction top side of the second panel 32 and is provided to face towards a vehicle width direction central portion 32A of the second panel 32.

The first panel 30 and the second panel 32 configure a center air conditioning duct 42 and a center defroster duct 44. The center air conditioning duct 42 serves as an air conditioning duct and communicates an air feed outlet 34 of the air conditioner 16 with the center air conditioning outlet 22; and the center defroster duct 44 serves as a defroster duct and communicates the air feed outlet 34 of the air conditioner 16 with the center defroster outlet 24.

Figure 2:
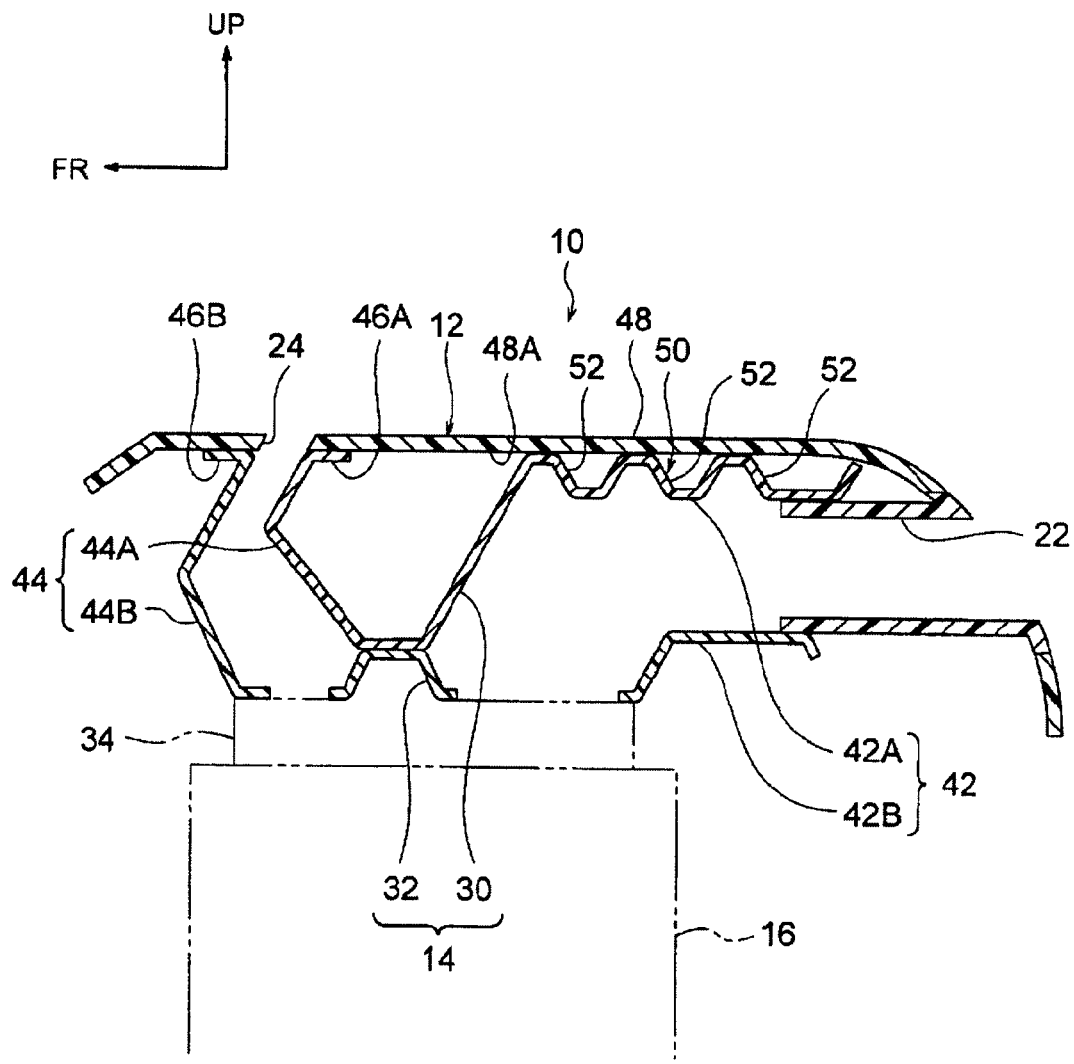
FIG. 2 is a cross-section of relevant portions of the instrument panel illustrated in FIG. 1, taken on line 2-2.

Namely, the first panel 30 is, as shown in FIG. 2, formed with a top side wall section 42A configuring the vehicle top-bottom direction top side of the center air conditioning duct 42, and a first wall section 44A configuring part of the vehicle front-rear direction rear side of the center defroster duct 44. Moreover, the second panel 32 is formed with a bottom side wall section 42B configuring the center air conditioning duct 42 in combination with the top side wall section 42A, and with a second wall section 44B that configures the center defroster duct 44 in combination with the first wall section 44A.

Joint portions 46A, 46B are respectively formed at the first wall section 44A and the second wall section 44B. The joint portions 46A, 46B are joined to a back face 48A of a central panel section 48 formed in the instrument panel main body 12 between the center air conditioning outlet 22 and the center defroster outlet 24.

Figure 3:
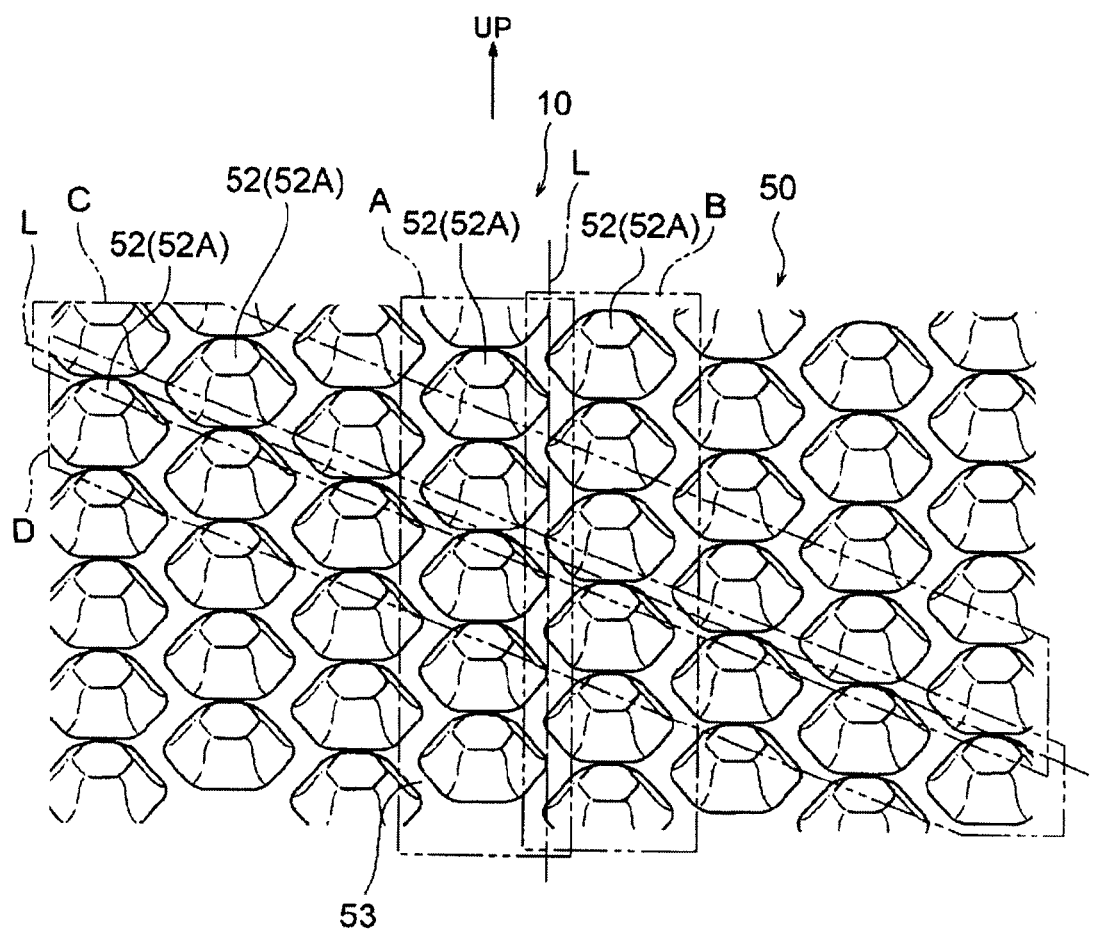
FIG. 3 is an enlarged perspective view of relevant portions of the reinforcement section illustrated in FIG. 1, as viewed from the vehicle top-bottom direction bottom side (the back side)

A portion of the top side wall section 42A is configured as a reinforcement section 50. Namely, plural bead shaped protruding portions 52 are formed at the reinforcement section 50, as shown in FIG. 3, so as to form protrusions towards the vehicle top-bottom direction top side (the instrument panel main body 12 side).

Each of the plural protruding portions 52 is formed in a regular hexagonal shape in plan view. The plural protruding portions 52 are arrayed such that a connecting portion 53 connects base end sides (the vehicle top-bottom direction bottom side) of the plural protruding portions 52 together so as to form an overall honeycomb pattern.

In other words, the plural protruding portions 52 are arrayed such that there are no un-bent line present between a first group of protruding portions 52 (say the plural protruding portions 52 in a vertical direction row surrounded by a rectangle A) and a second group of protruding portions 52 (say the plural protruding portions 52 in a vertical direction row surrounded by a rectangle B) that are disposed alongside each other.

Namely, configuration is made such that if a boundary line L is set between the first group of protruding portions 52 and the second group of protruding portions 52, part of each of the protruding portions 52 belonging to the first group are positioned on the boundary line L, and part of each of the protruding portions 52 belonging to the second group are positioned on the boundary line L.

Note that reference to the first group of protruding portions 52 and the second group of protruding portions 52 that are alongside each other does not only refer to the plural protruding portions 52 in a vertical direction row surrounded by the rectangle A referred to above and the plural protruding portions 52 in a vertical direction row surrounded by the rectangle B. It also means, for example, the plural protruding portions 52 in a diagonal direction row surrounded by a rectangle C and the plural protruding portions 52 in a diagonal direction row surrounded by a rectangle D, and, while not specifically illustrated, it also means that the plural protruding portions 52 in a horizontal direction row and the plural protruding portions 52 alongside in a horizontal direction row, and the plural protruding portions 52 in a diagonal direction row in the other direction to that of the protruding portions 52 surrounded by the rectangles C, D and the plural protruding portions 52 in a diagonal row alongside.

Figure 4:
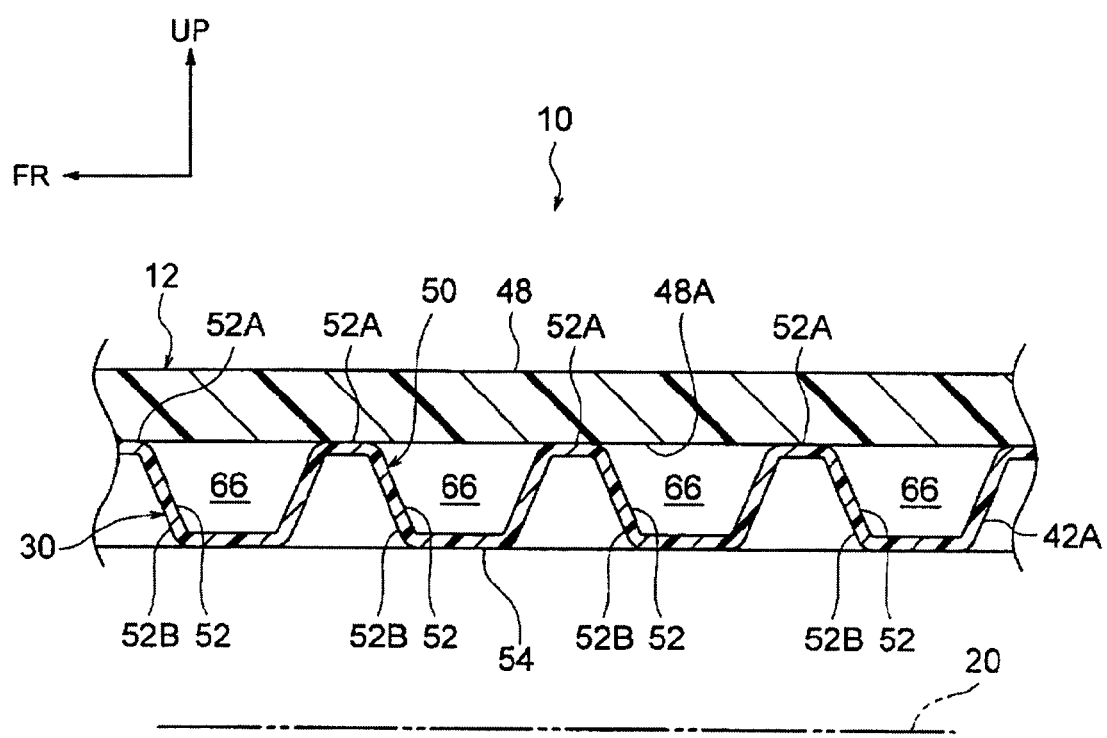
FIG. 4 is an enlarged cross-section of relevant portions of the instrument panel illustrated in FIG. 1.

The leading end face of each of the plural protruding portions 52 configures a load bearing face 52A and is formed in a flat planar shape. Each of the load bearing faces 52A is joined, for example by welding, to the back face 48A of the central panel section 48, as shown in FIG. 4. A portion of the reinforcement section 50 configures a connecting portion 54 that forms a honeycomb pattern and connects the base end sides (the vehicle top-bottom direction bottom sides) of the plural protruding portions 52 together. In the reinforcement section 50, side walls 52B of the protruding portions 52 disposed between the instrument panel main body 12 and the connecting portion 54 exhibit the role of reinforcement ribs.

As shown in FIG. 1, the second panel 32 is configured with side air conditioning ducts 56 that communicate the air feed outlet 34 of the air conditioner 16 with the side air conditioning outlets 26, and with side defroster duct upstream sections 58A that configure the upstream side of side defroster ducts 58 and communicate the air feed outlet 34 of the air conditioner 16 with the side defroster outlets 28. The side air conditioning ducts 56 and the side defroster duct upstream sections 58A are respectively formed with hat shape cross-sections that are open towards the instrument panel main body 12 side.

Figure 5:
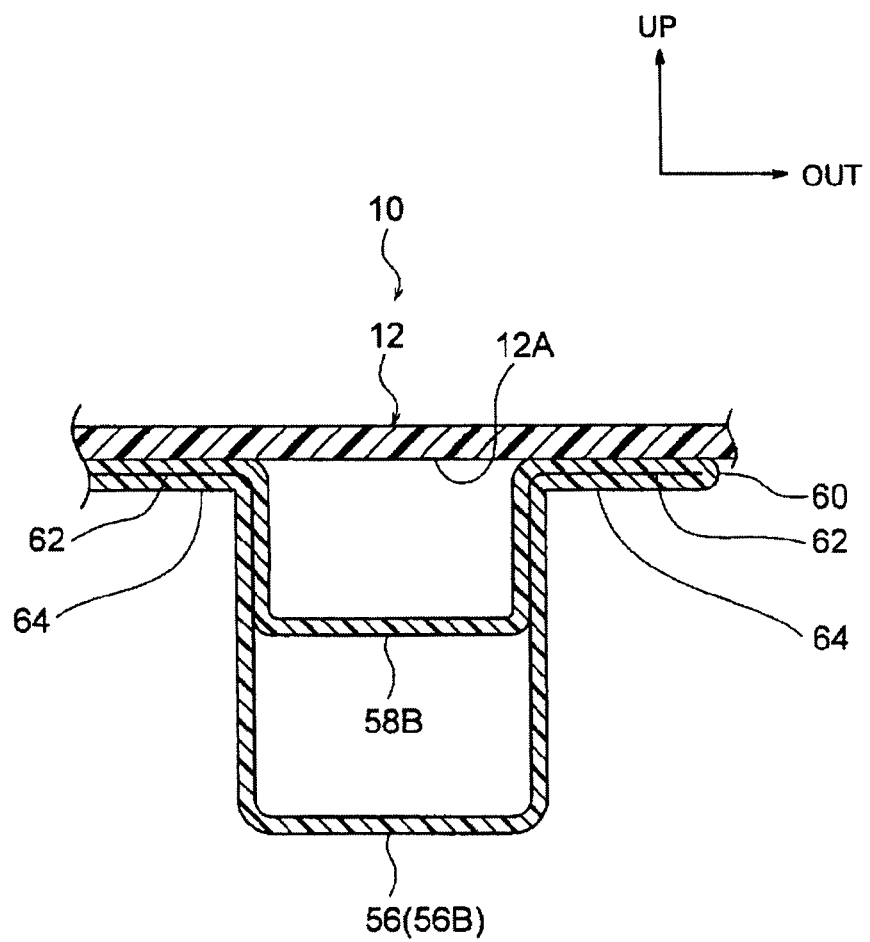
FIG. 5 is an enlarged cross-section of relevant portions of the instrument panel illustrated in FIG. 1, taken on line 5-5.

Side defroster duct downstream sections 58B are integrally formed at a vehicle width direction outside of downstream sections 56B of the side air conditioning ducts 56 with integral hinges 60 being provided between the downstream sections 56B and the side defroster duct downstream sections 58B. The side defroster duct downstream sections 58B are, as shown in FIG. 5, formed with hat shaped cross-sections, and fold back about the integral hinges 60 so as to be superimposed in the vehicle top-bottom direction with the downstream sections 56B of the side air conditioning ducts 56.

Joint portions 62 are formed at two sides of each of the side defroster duct downstream sections 58B. When the side defroster duct downstream sections 58B are in a folded back state as described above, the joint portions 62 are superimposed with joint portions 64 formed at two sides of the side air conditioning ducts 56. In a superimposed state with the joint portions 62, the joint portions 64 along with the joint portions 62 are joined, for example by welding, to a back face 12A of the instrument panel main body 12.

The side defroster duct downstream sections 58B are, as shown in FIG. 1, configured such that one end of the side defroster duct downstream sections 58B is open, and the other end is a closed end. In the vehicle top-bottom direction superimposed state with the side air conditioning ducts 56 as described above (see FIG. 5) the side defroster duct downstream sections 58B configure the downstream sides of the side defroster ducts 58 and are in communication with the side defroster duct upstream sections 58A.

In a state in which the second panel 32 has been joined to the instrument panel main body 12, an air feed path that communicates the air feed outlet 34 of the air conditioner 16 with the side air conditioning outlets 26 is formed by a closed cross-section configured by the upstream sections 56A of the side air conditioning ducts 56 and the instrument panel main body 12, and a closed cross-section configured by the downstream sections 56B of the side air conditioning ducts 56 and the side defroster duct downstream sections 58B.

In the state in which the second panel 32 has been joined to the instrument panel main body 12, an air feed path that communicates the air feed outlet 34 of the air conditioner 16 with the side defroster outlets 28 is formed by a closed cross-section configured by the side defroster duct upstream sections 58A and the instrument panel main body 12, and a closed cross-section configured by the side defroster duct downstream sections 58B and the instrument panel main body 12.

The first panel 30 and the second panel 32 configuring the duct configuring member 14 are integrally formed by a specific molding machine. Namely, the first panel 30 and the central portion 32A of the second panel 32 facing the first panel 30 are formed for example by blow molding, and two vehicle width direction end portions 32B of the second panel 32 are respectively formed by vacuum molding.

Although not specifically illustrated, the second panel 32 is also formed with plural joint portions other than the joint portion 46B and the joint portions 62, 64, and the second panel 32 is joined to the back face of the instrument panel main body 12 by the joint portions.

Explanation follows regarding the operation and advantageous effects of the first exemplary embodiment of the present invention.

In the instrument panel 10, when conditioned air is fed from the air feed outlet 34 of the air conditioner 16 illustrated in FIG. 2 to the center air conditioning duct 42, the conditioned air is guided through the center air conditioning duct 42 to the center air conditioning outlet 22, and blown out into the vehicle interior from the center air conditioning outlet 22.

The vehicle top-bottom direction top side of the center air conditioning duct 42 is configured by the top side wall section 42A of the first panel 30. Hence even when the above conditioned air is cold air, the cold air does not directly contact the back face of the instrument panel main body 12 and so condensation can be suppressed from developing on a front face of the instrument panel main body 12 corresponding to the center air conditioning duct 42.

Although the top side wall section 42A is integrally formed to the first panel 30, since condensation is suppressed from developing on the front face of the instrument panel main body 12, this eliminates the need to provide a separate member to the first panel 30, such as separate thermal insulation material.

Additionally, according to the instrument panel 10, the reinforcement section 50 is formed at the top side wall section 42A, and, as shown in FIG. 4, the reinforcement section 50 is formed with the plural protruding portions 52 forming protrusions to the instrument panel main body 12 side with the load bearing faces 52A at their leading ends, and with the connecting portion 54 that connects together the base end sides of the plural protruding portions 52. The load bearing faces 52A of the plural protruding portions 52 are also all joined to the back face 48A (to the face on the vehicle structural body 20 side) of the central panel section 48.

The rigidity of the central panel section 48 is accordingly raised by a closed cross-section 66 formed between the plural protruding portions 52, and the central panel section 48 can hence be suppressed from deforming more than necessary even when a load or impact is applied to the central panel section 48. When a load or impact is applied to the central panel section 48, the load or impact is borne by the load bearing faces 52A of each of the protruding portions 52, stress is dispersed by each of the load bearing faces 52A and stress can be suppressed from being concentrated at a particular portion of the central panel section 48. Breakage of the central panel section 48 can accordingly be suppressed even when a load or impact is applied to the central panel section 48.

Adopting such a structure for reinforcing the instrument panel main body 12 enables the instrument panel main body 12 to be made thinner walled, and enables reductions in weight and cost to be achieved.

Part of the first panel 30 is also utilized as the reinforcement section 50, and so an increase in the number of components can be avoided, and further reductions in weight and cost can be achieved.

The protruding portions 52, as shown in FIG. 3, do not have un-bent line portions present between the first group of protruding portions 52 and the second group of protruding portions 52 disposed alongside, and so creasing of the reinforcement section 50 can be suppressed, enabling the rigidity of the reinforcement section 50 to be secured.

The locations between the plural protruding portions 52 serve the role of a resonance cell, and so can exhibit a noise absorbing effect due to sound resonance effects. Thus sound absorbing material disposed at the back side of the instrument panel main body 12 can either be made more compact or dispensed with altogether.

The two vehicle width direction end portions 32B of the second panel 32 illustrated in FIG. 1 are formed by vacuum molding, enabling the wall thickness of these portions to be made thinner, and enabling further reductions in weight and cost to be achieved.

The side defroster duct downstream sections 58B are folded back about the integral hinges 60, and the downstream sections 56B of the side air conditioning ducts 56 and the side defroster duct downstream sections 58B are overlapped. There is accordingly no limitation placed on placement of the side air conditioning outlets 26 and the side defroster outlets 28, enabling a structure to be achieved in which the side air conditioning ducts 56 and the side defroster ducts 58 are integrated together using a simple configuration.

Explanation follows regarding a modified example of the first exemplary embodiment of the present invention.

In the above exemplary embodiment, the reinforcement section 50 is formed at the top side wall section 42A configuring the center air conditioning duct 42, however the following configuration may also be adopted.

Figure 6:
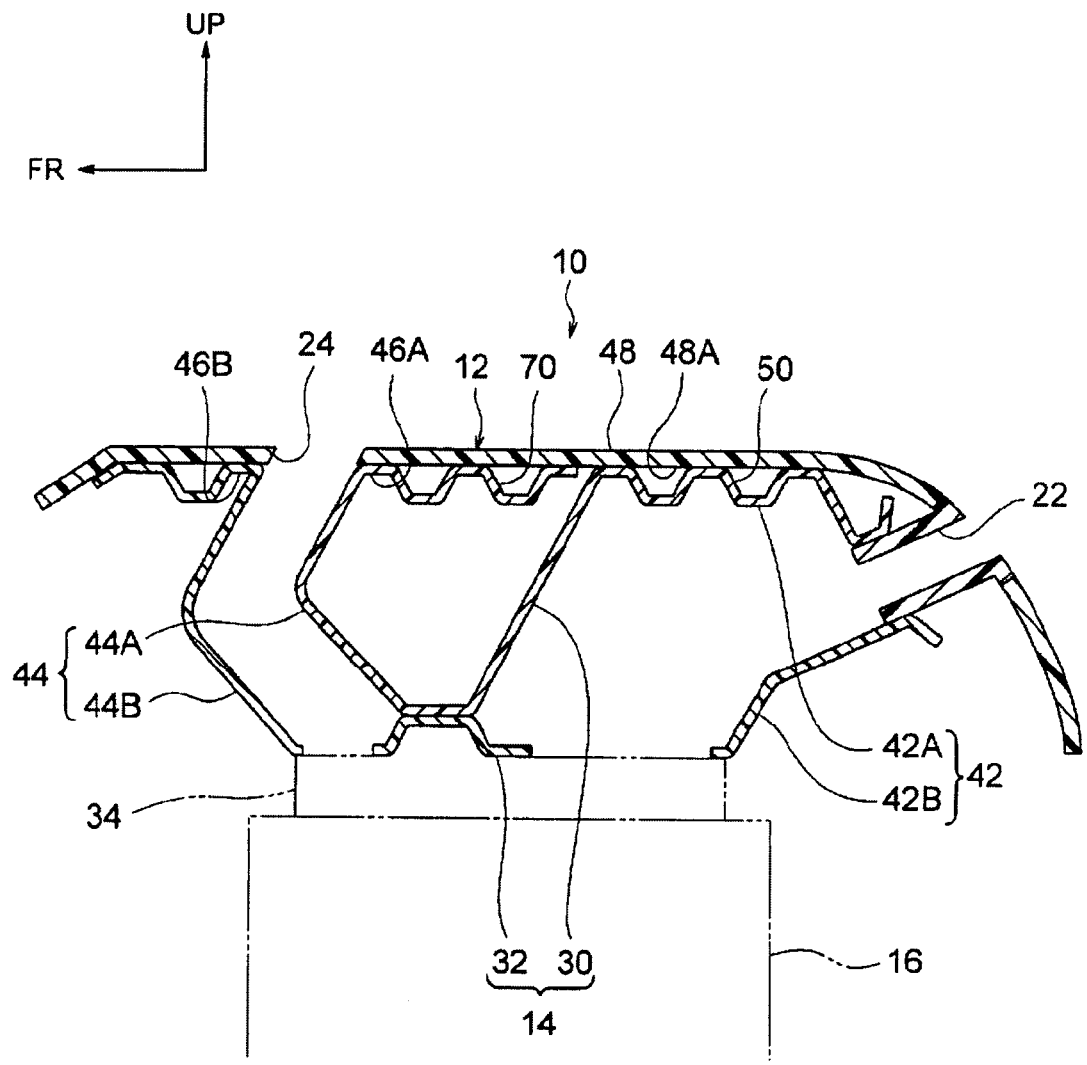
FIG. 6 is a cross-section illustrating a modified example of the instrument panel according to the first exemplary embodiment of the present invention.

Namely, in the modified example illustrated in FIG. 6, a reinforcement section 70 is formed to the first panel 30 in addition to the reinforcement section 50. The reinforcement section 70 is formed contiguous to the first wall section 44A, and is disposed between the first wall section 44A and the top side wall section 42A (namely formed at a portion that is not the center air conditioning duct 42 or the center defroster duct 44). The reinforcement section 70 is configured similarly to the reinforcement section 50 (see FIG. 3 and FIG. 4), and the reinforcement section 70, in combination with the reinforcement section 50 disposed so as to be contiguous in the vehicle front-rear direction alongside the reinforcement section 70, reinforces the instrument panel main body 12.

The instrument panel main body 12 can accordingly be reinforced over a wider range by adopting such a configuration.

Note that when, for example, reinforcement of the reinforcement section 70 alone is sufficient then configuration may be made without forming the reinforcement section 50 to the top side wall section 42A.

Adopting such a configuration enables, for example, limitation to the placement and shape of the center air conditioning duct 42 to be avoided, and impact to the flow of air inside the center air conditioning duct 42 can also be avoided.

When the reinforcement section 50 is not formed to the top side wall section 42A, preferably a thermal insulation space is secured between the top side wall section 42A and the instrument panel main body 12.

In the present exemplary embodiment, only the two vehicle width direction end portions 32B of the second panel 32 are respectively formed by vacuum molding, however the whole of the first panel 30 and the second panel 32 may be respectively formed by vacuum molding. Alternatively, other portions of the first panel 30 and the second panel 32 may also be formed by vacuum molding.

Figure 7:
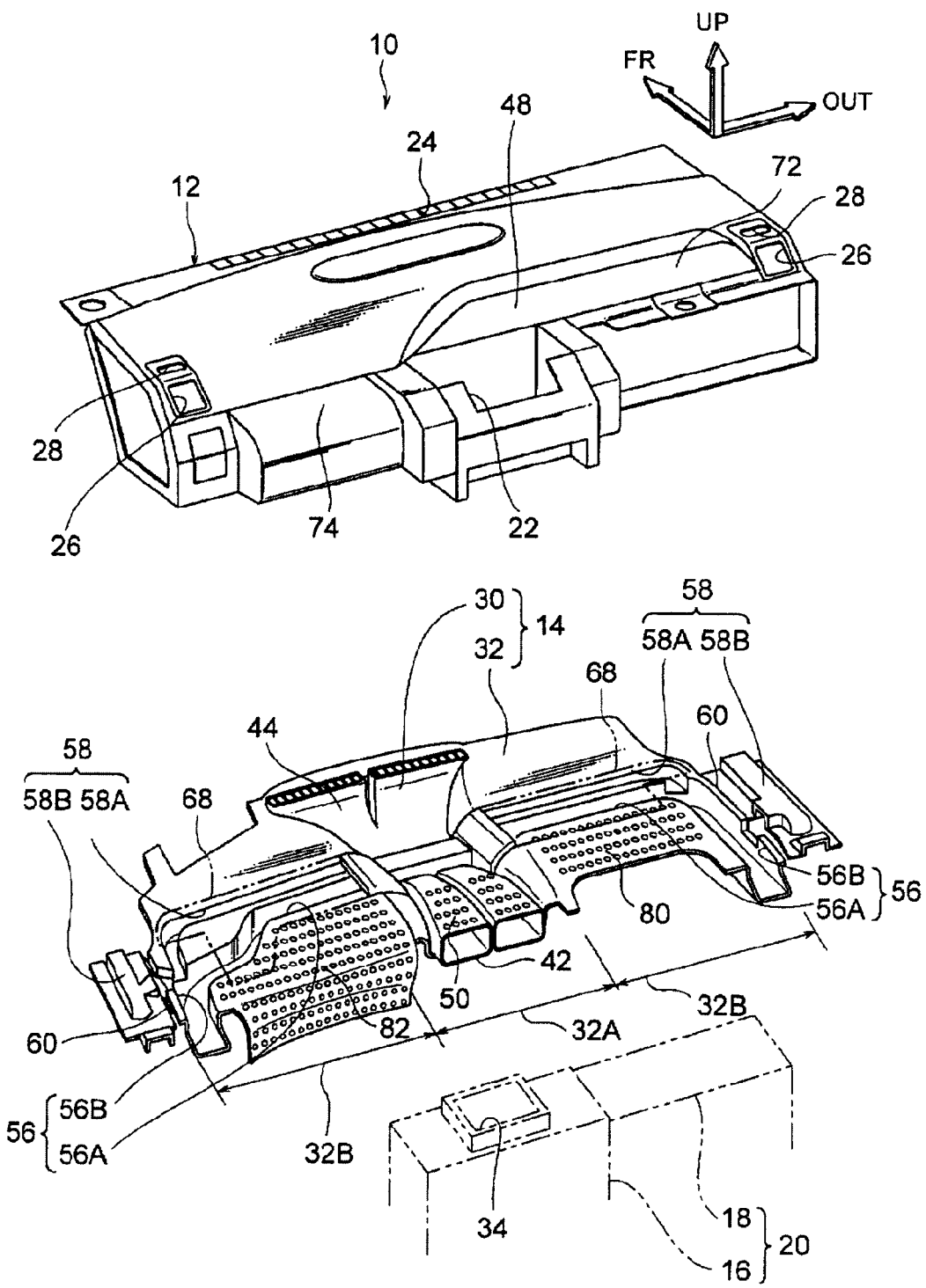
FIG. 7 is an exploded perspective view of a modified example of an instrument panel according to the first exemplary embodiment.

In the present exemplary embodiment the reinforcement section 50 is formed at the first panel 30, however as shown in FIG. 7, reinforcement sections 80, 82 that are similar to the reinforcement section 50 may also be formed at joint portions of the second panel 32 to a right side panel section 72 and left side panel section 74 of the instrument panel main body 12. Configuration may also be made by forming only one of the reinforcement sections 80, 82.

In the above exemplary embodiment, the plural protruding portions 52 are formed with regular hexagonal shapes in plan view, however plural protruding portions 52 may each be formed in circular shapes in plan view.

Creasing of the reinforcement section 50 is also suppressed by such a configuration, and the rigidity of the reinforcement section 50 can be secured.

In the above exemplary embodiment, all the load bearing faces 52A of the plural protruding portions 52 are joined to the back face 48A of the central panel section 48, however the load bearing faces 52A of some of the plural protruding portions 52 (for example a central protruding portion 52 surrounded by the six protruding portions 52) need not necessarily be joined to the back face 48A of the central panel section 48. Namely, it is sufficient for the load bearing faces 52A of some of the plural protruding portions 52 to be joined to the back face 48A of the central panel section 48.

In the above exemplary embodiment, the plural protruding portions 52 are formed in rows in two mutually orthogonal directions along the instrument panel main body 12. However, configuration may be made with projections formed to extend mutually parallel in a particular direction, or configuration may be made with the projection portions connected to each other so as to form an overall honeycomb pattern.

Moreover, in the above exemplary embodiment, as indicated by the intermittent lines in FIG. 1, sheet members 68 may be provided as separate bodies to the first panel 30 and the second panel 32, with the sheet members 68 joined in a superimposed state with the second panel 32 so as to close off the respective openings on the instrument panel main body 12 side of the upstream sections 56A of the side air conditioning ducts 56 and the side defroster duct upstream sections 58A. Namely, the vehicle top-bottom direction top side of the upstream sections 56A of the side air conditioning ducts 56 and the side defroster duct upstream sections 58A may be configured by the sheet members 68.

Adopting such a configuration enables condensation to be suppressed from developing on the front face of the instrument panel main body 12 corresponding to the side air conditioning ducts 56 and the side defroster ducts 58 even when cooled air flows through inside the side air conditioning ducts 56 and the side defroster ducts 58, since the cooled air does not make direct contact with the back face of the instrument panel main body 12.

Note that the sheet members 68 may also be applied in the modified example illustrated in FIG. 7.

Second Exemplary Embodiment

Explanation follows regarding a second exemplary embodiment of the present invention.

Figure 8:
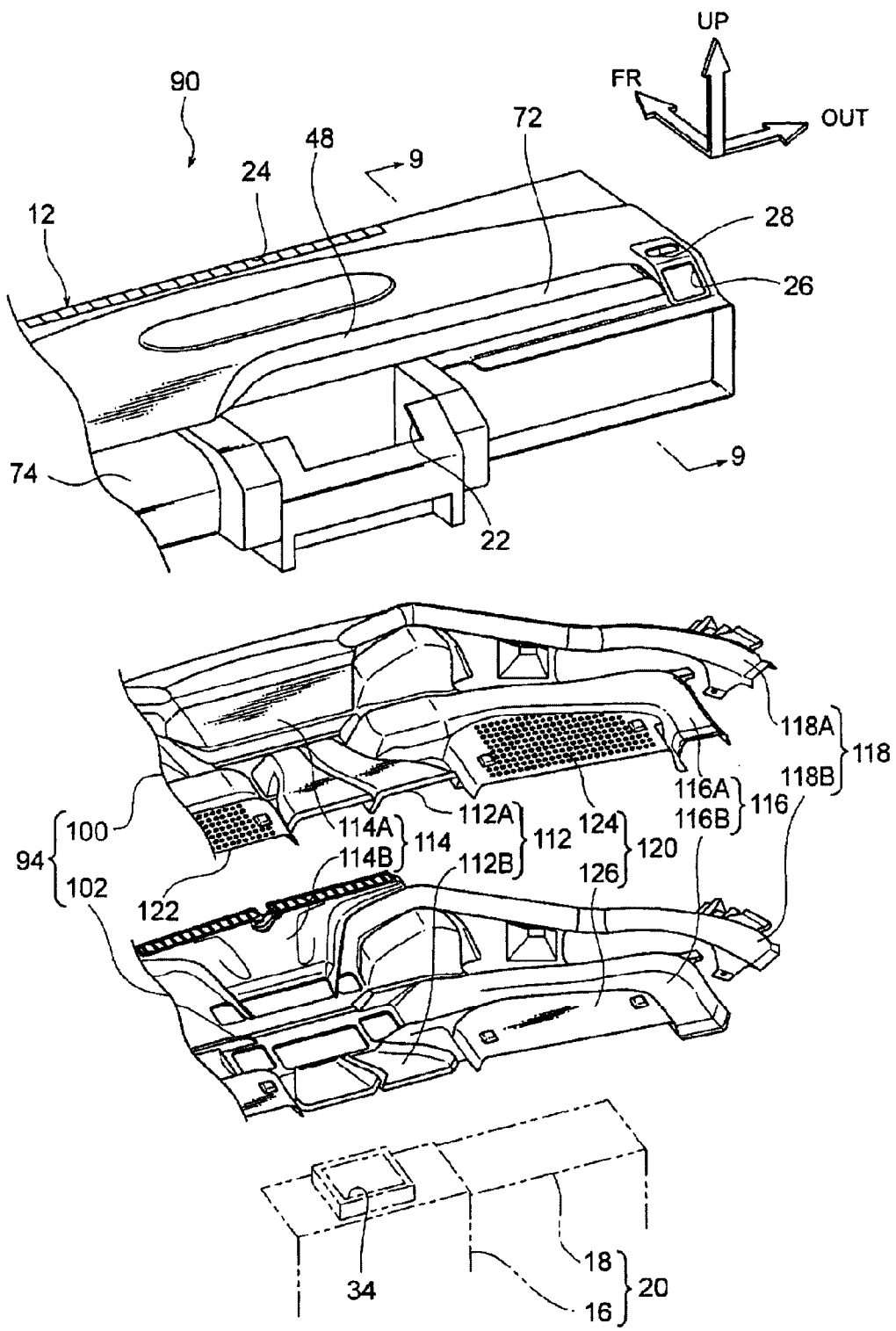
FIG. 8 is an exploded perspective view of an instrument panel according to a second exemplary embodiment of the present invention.

As shown in FIG. 8, an instrument panel 90 serving as a vehicle instrument panel according to a second exemplary embodiment of the present invention is equipped with an instrument panel main body 12 and a duct configuring member 94.

The instrument panel main body 12 is configured similarly to that of the first exemplary embodiment of the present invention. A right side panel section 72 and a left side panel section 74 of the instrument panel main body 12 are respectively reinforced by reinforcement sections 120, 122, described later.

The duct configuring member 94 is manufactured from a resin and provided between the instrument panel main body 12 and a vehicle structural body 20. The duct configuring member 94 is configured by a first panel 100 and a second panel 102 disposed at the vehicle top-bottom direction bottom side.

The first panel 100 and the second panel 102 are each configured including: a center air conditioning duct 112 that serves as an air conditioning duct and communicates an air feed outlet 34 of an air conditioner 16 with the center air conditioning outlet 22; a center defroster duct 114 that serves as a defroster duct and communicates the air feed outlet 34 with a center defroster outlet 24; side air conditioning ducts 116 that serve as air conditioning ducts and communicate the air feed outlet 34 of the air conditioner 16 with side air conditioning outlets 26; and side defroster ducts 118 that serve as defroster ducts and communicate the air feed outlet 34 of the air conditioner 16 with side defroster outlets 28.

The first panel 100 is formed with a top side wall section 112A configuring the vehicle top-bottom direction top side of the center air conditioning duct 112, a first wall section 114A configuring a section of the vehicle front-rear direction rear side of the center defroster duct 114, top side wall sections 116A configuring the vehicle top-bottom direction top side of the side air conditioning ducts 116, and top side wall sections 118A configuring the vehicle top-bottom direction top side of the side defroster ducts 118.

The second panel 102 is configured with: a bottom side wall section 112B configuring the center air conditioning duct 112 in combination with the top side wall section 112A; a second wall section 114B that configures the center defroster duct 114 in combination with the first wall section 114A; and bottom side wall sections 116B that configure the side air conditioning duct 116 in combination with the top side wall sections 116A, and bottom side wall sections 118B that configure the side defroster ducts 118 in combination with the top side wall sections 118A.

The first panel 100 and the second panel 102 are, for example, formed as separate members by vacuum molding or injection molding.

Figure 9:
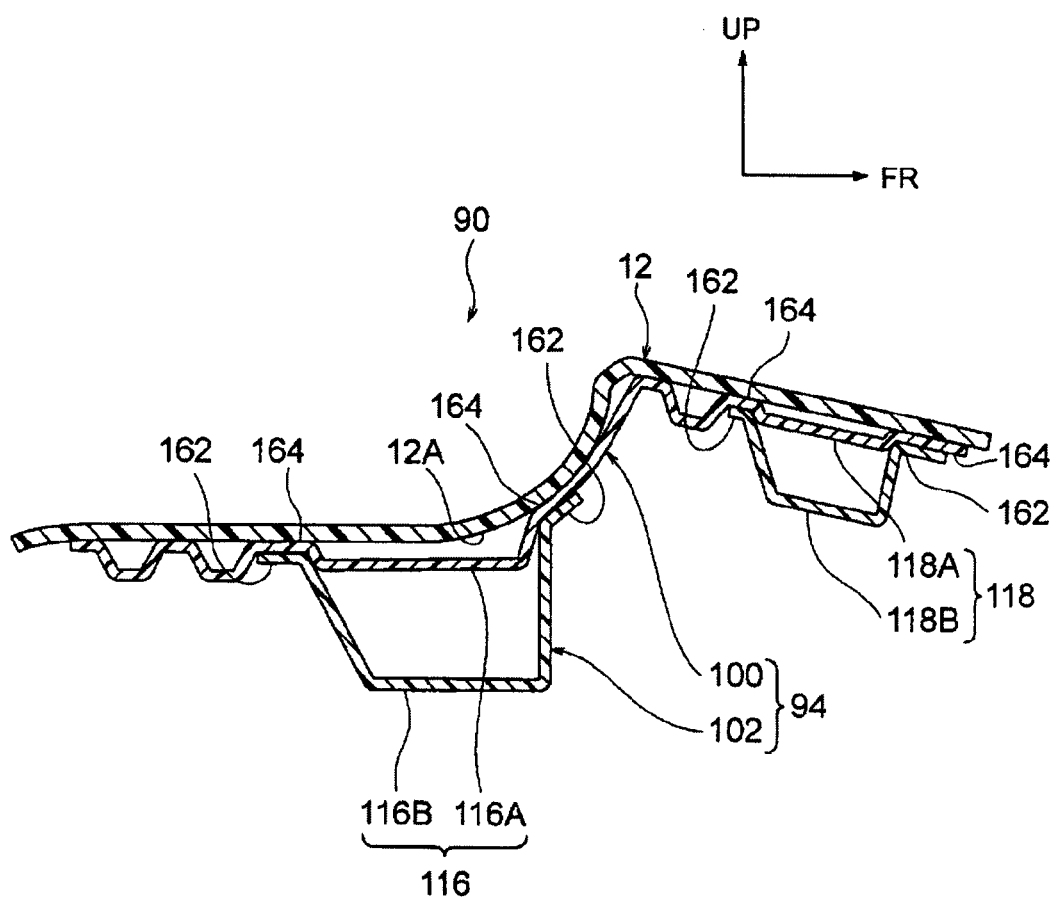
FIG. 9 is a cross-section of relevant portions of the instrument panel illustrated in FIG. 8, taken on line 9-9.

As shown in FIG. 9, joint portions 162 of the second panel 102 to the instrument panel main body 12 are placed in a superimposed state with joint portions 164 of the first panel 100 to the instrument panel main body 12, and joined together with the joint portions 164 (at the same time as the joint portions 164) to the back face 12A of the instrument panel main body 12, such as by welding.

Whilst not specifically illustrated in the drawings, other joint portions of the second panel 102 are also placed in a superimposed state with other joint portions of the first panel 100, and joined together with the other joint portions of the first panel 100 (at the same time as the other joint portions) to the back face 12A of the instrument panel main body 12, such as by welding.

As shown in FIG. 8, portions of the duct configuring member 94 other than the center air conditioning duct 112, the center defroster duct 114, the side air conditioning ducts 116 and the side defroster ducts 118, at locations facing the right side panel section 72 and left side panel section 74 in the vehicle top-bottom direction are respectively formed with the reinforcement sections 120, 122.

Note that the pair of reinforcement sections 120, 122 are configured substantially the same as each other. Explanation hence follows for the reinforcement section 120 on the right hand side (the passenger seat side), with explanation omitted for the reinforcement section 122 on the left hand side (the driver seat side).

The reinforcement section 120 is configured including a first reinforcement panel section 124 formed to the first panel 100, and a second reinforcement panel section 126 serving as a connecting portion formed to the second panel 102.

Figure 10:
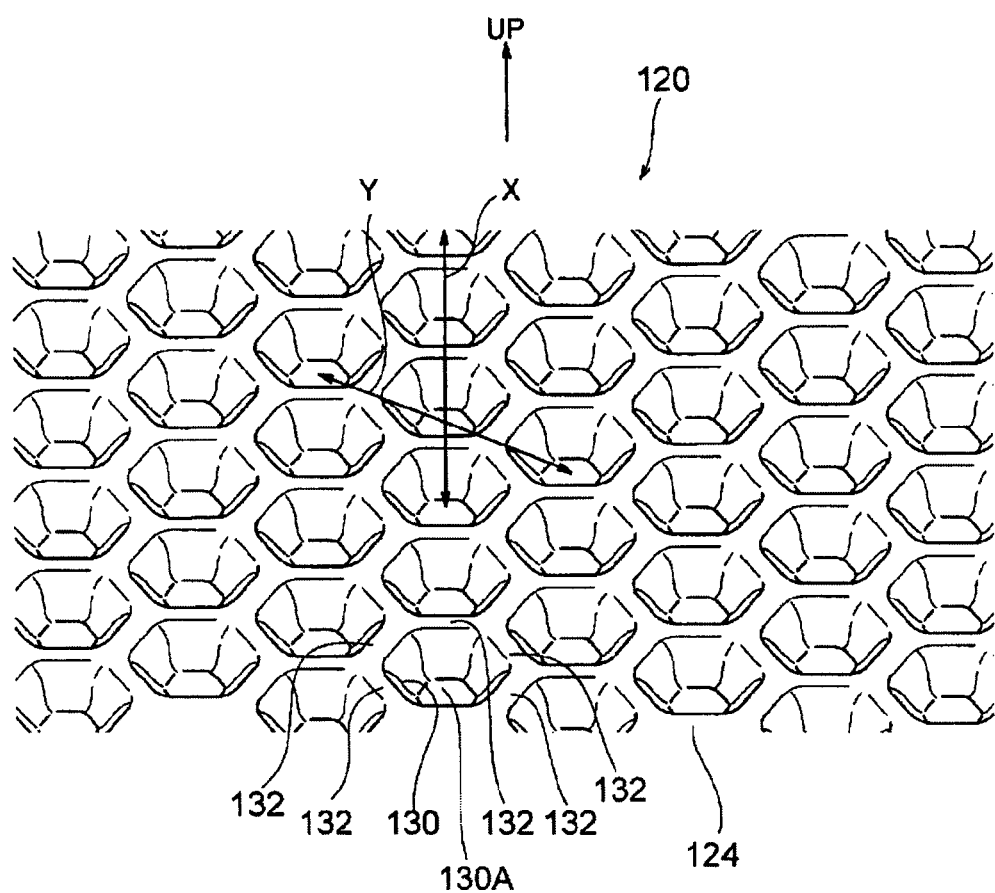
FIG. 10 is an enlarged perspective view of relevant portions of the reinforcement section illustrated in FIG. 8, as viewed from the vehicle top-bottom direction top side (the front side)

As shown in FIG. 10, plural beads 130 forming protrusions towards the vehicle top-bottom direction bottom side are formed in the first reinforcement panel section 124. The plural beads 130 are formed in two mutually orthogonal directions (X direction and Y direction) along the right side panel section 72 (see FIG. 8) formed at the instrument panel main body 12.

When bottom faces 130A of the plural beads 130 act as reference faces, the first reinforcement panel section 124 could be described as having protrusion portions 132 formed as protrusions on the vehicle top-bottom direction top side (the instrument panel main body 12 side) between adjacent bottom faces 130A of the plural beads 130. The plural protrusion portions 132 are mutually connected together so as to form an overall honeycomb pattern.

Figure 11:
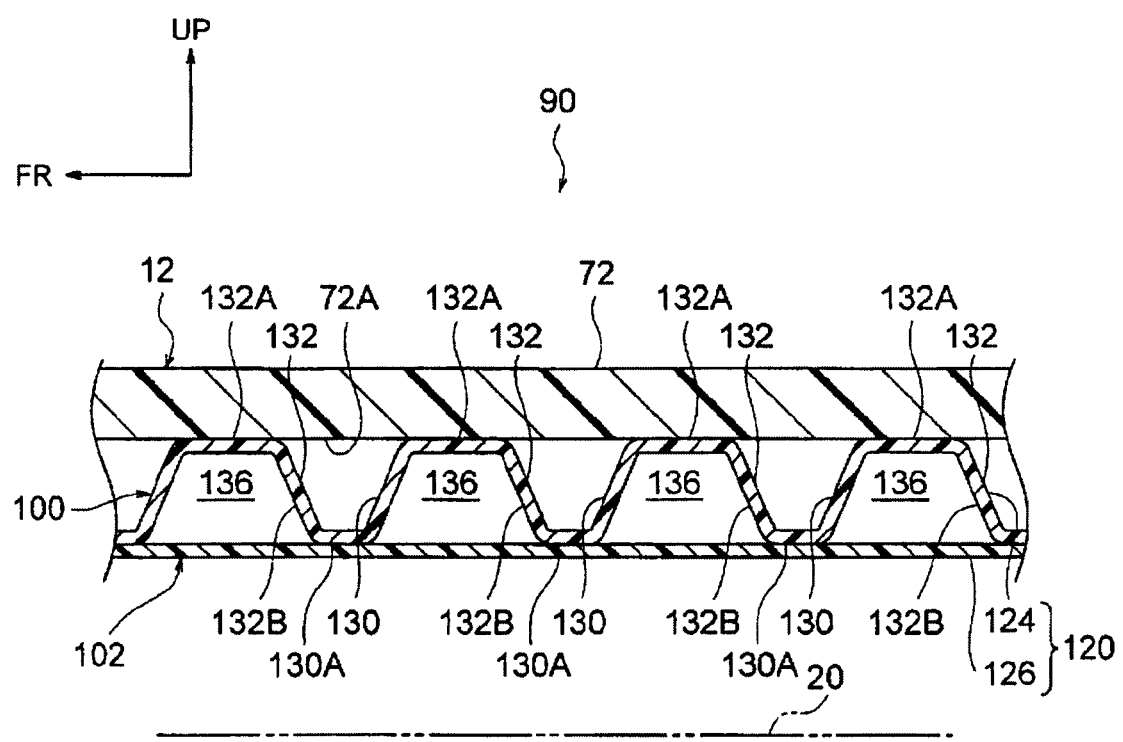
FIG. 11 is an enlarged cross-section of relevant portions of the instrument panel illustrated in FIG. 8.

The leading end faces of the plural protrusion portions 132 configure load bearing faces 132A, formed in a flat plane shape. The load bearing faces 132A are, as shown in FIG. 11, joined to a back face 72A of the right side panel section 72 (the face on the vehicle structural body 20 side), for example by welding. The bottom faces 130A of each of the beads 130 are joined to the second reinforcement panel section 126. The base end sides of the plural protrusion portions 132 are thereby connected together by the second reinforcement panel section 126. In the reinforcement section 120, side walls 132B of the protrusion portions 132 disposed between the instrument panel main body 12 and the second reinforcement panel section 126 perform the role of reinforcement ribs.

The reinforcement section 120 is also disposed with a separation in the vehicle top-bottom direction to the vehicle structural body 20 that is covered by the instrument panel main body 12.

Explanation follows regarding operation and advantageous effects of the second exemplary embodiment of the present invention.

In the instrument panel 90, when conditioned air is supplied from the air feed outlet 34 of the air conditioner 16 illustrated in FIG. 8 to the center air conditioning duct 112, the conditioned air is guided through the center air conditioning duct 112 to the center air conditioning outlet 22 and then blown out into the vehicle interior from the center air conditioning outlet 22.

The vehicle top-bottom direction top side of the center air conditioning duct 112 is configured by top side wall sections 112A of the first panel 100. Condensation can accordingly be suppressed from developing on the front face of the instrument panel main body 12 even when the conditioned air is cooled air, since the cooled air does not make direct contact with the back face of the instrument panel main body 12.

Similarly, the vehicle top-bottom direction top sides of the side air conditioning ducts 116 are configured by the top side wall sections 116A of the first panel 100. Condensation can accordingly be suppressed from developing on the front face of the instrument panel main body 12 even when cooled air is supplied from the air feed outlet 34 of the air conditioner 16 to the side air conditioning ducts 116, since the cooled air does not make direct contact with the back face of the instrument panel main body 12.

The top side wall sections 112A, 116A are also integrally formed to the first panel 100, thereby eliminating the need to provide a separate member to the first panel 100, such as separate thermal insulation material, in order to suppress condensation from developing on the front face of the instrument panel main body 12.

The reinforcement section 120 is formed to the duct configuring member 94, and, as shown in FIG. 11, the reinforcement section 120 is formed with the plural protrusion portions 132 forming protrusions towards the instrument panel main body 12 side with the load bearing faces 132A at their leading ends, and with the second reinforcement panel section 126 that connects the base end sides of the plural protrusion portions 132 together. The load bearing faces 132A of the plural protrusion portions 132 are all also joined to the back face 72A of the right side panel section 72.

Consequently, since the rigidity of the right side panel section 72 is raised by a closed cross-section 136 between the plural protrusion portions 132, the right side panel section 72 can be suppressed from deforming more than necessary even when a load or impact is applied to the right side panel section 72. Moreover, when a load or impact is applied to the right side panel section 72, the load bearing face 132A of each of the protrusion portions 132 bears the load or impact. Stress is accordingly distributed by each of the load bearing faces 132A, and stress is hence suppressed from being concentrated at a particular location of the right side panel section 72. Breakage of the right side panel section 72 can accordingly be suppressed even when a load or impact is applied to the right side panel section 72.

Adopting such a structure to reinforce the instrument panel main body 12 enables the wall thickness of the instrument panel main body 12 to be made thinner, and enables reductions in weight and cost to be achieved.

An increase in the number of components is avoided due to utilizing part of the duct configuring member 94 for the reinforcement sections 120, 122, enabling further reductions in weight and cost to be achieved.

The reinforcement sections 120, 122 are formed at portions other than the center air conditioning duct 112, the center defroster duct 114, the side air conditioning ducts 116 and the side defroster ducts 118. There is accordingly no limitation imposed on the placement of these ducts, and impact to the flow of air inside these ducts can be avoided.

According to the instrument panel 90, as shown in FIG. 10, the plural protrusion portions 132 are formed mutually connected together so as to form an overall honeycomb pattern, and so creasing of the reinforcement section 120 can be suppressed, and the rigidity of the reinforcement section 120 can be secured.

Locations between the plural protrusion portions 132 serve the role of resonance cells, and so a noise absorbing effect can be exhibited due to sound resonance effects. Thus sound absorbing material disposed at the back side of the instrument panel main body 12 can either be made more compact or dispensed with altogether.

As shown in FIG. 9, the joint portions in the second panel 102 to the instrument panel main body 12 (the joint portions 162 and the other joint portions) are all placed in a superimposed state with the joint portions of the first panel 100 to the instrument panel main body 12 (the joint portions 164 and the other joint portions) and then joined to the back face 12A of the instrument panel main body 12 together with these joint portions (at the same time as these joint portions). The joint portions of the second panel 102 can hence be joined together with the joint portions of the first panel 100 to the back face 12A of the instrument panel main body 12 in a single process, enabling assembly processes to be shortened.

Explanation follows regarding a modified example of the second exemplary embodiment of the present invention.

The second exemplary embodiment is configured with each of the plural beads 130 formed in a regular hexagonal shape in plan view, however then may be respectively formed in circular shapes in plan view.

In such a configuration, creasing of the reinforcement section 120 is suppressed and the rigidity of the reinforcement section 120 can be secured.

In the second exemplary embodiment, the load bearing faces 132A of the protrusion portions 132 are all joined to the back face 72A of the right side panel section 72, however configuration may be made with some of the load bearing faces 132A from out of the protrusion portions 132 not joined to the back face 72A of the right side panel section 72. Namely, it is sufficient for the load bearing faces 132A of some of the protrusion portions 132 to be joined to the back face 72A of the right side panel section 72.

Similarly, not all of the bottom faces 130A of the plural beads 130 need be joined to the second reinforcement panel section 126. Configuration may be made with the bottom faces 130A of some of the plural beads 130 joined to the second reinforcement panel section 126.

In the second exemplary embodiment, the plural protrusion portions 132 are formed so as to form an overall honeycomb pattern, however configuration may be made such that the protrusion portions 132 are formed extending in particular respective directions and mutually parallel to each other.

A reinforcement section similar to the reinforcement section 50 of the first exemplary embodiment (see FIG. 1 to FIG. 4) may also be formed at the top side wall section 112A in the second exemplary embodiment. A reinforcement section similar to the reinforcement section 70 of the first exemplary embodiment (see FIG. 6) may also be formed connected to the first wall section 114A and disposed between the first wall section 114A and the top side wall section 112A.

In the second exemplary embodiment, the reinforcement sections 120, 122 are respectively formed at the joint portions of the duct configuring member 94 to the right side panel section 72 and the left side panel section 74 of the instrument panel main body 12. However, configuration may be made with only one or other formed.

Third Exemplary Embodiment

Explanation follows regarding a third exemplary embodiment of the present invention.

Figure 12:
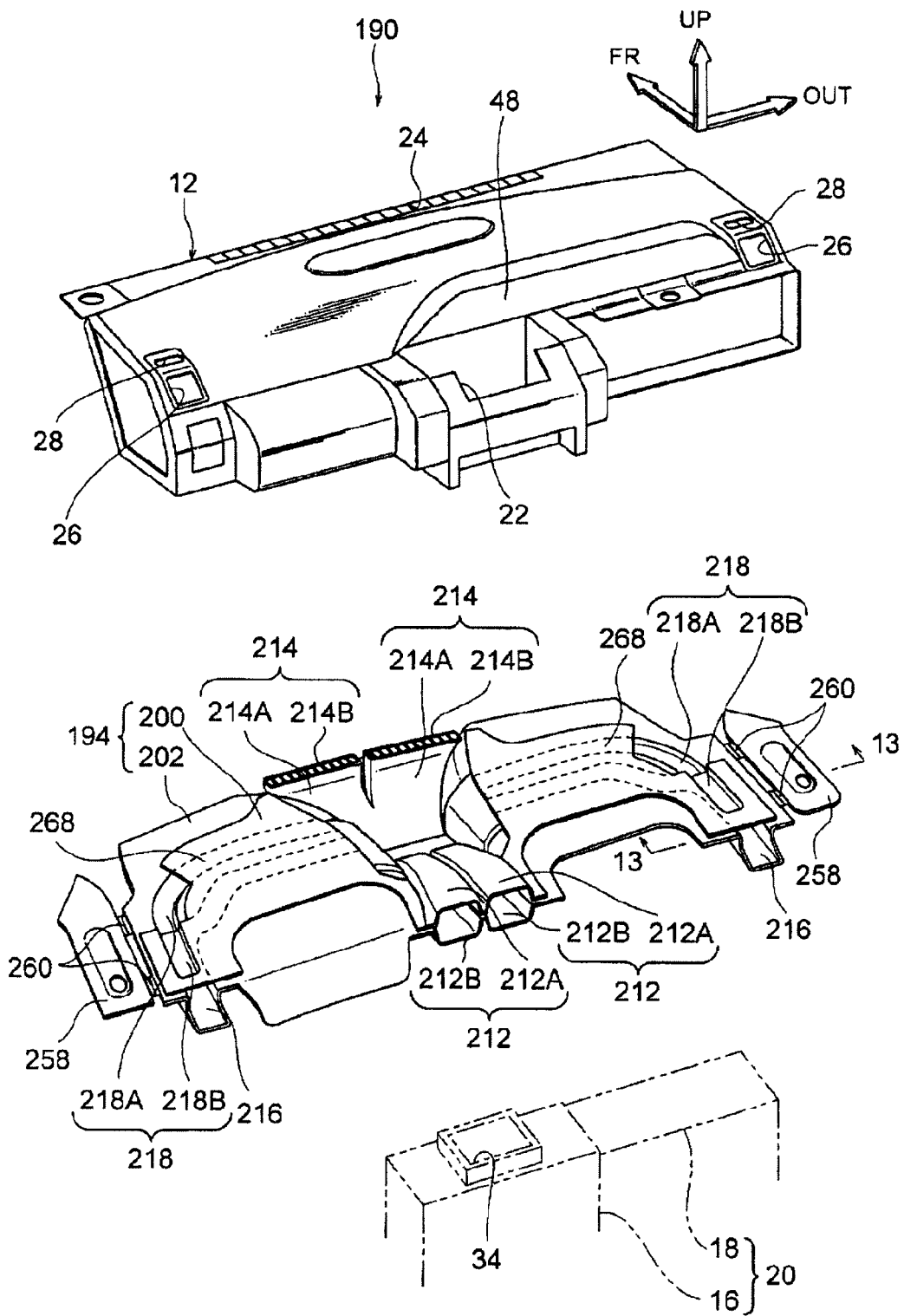
FIG. 12 is an exploded perspective view of an instrument panel according to a third exemplary embodiment of the present invention.

As shown in FIG. 12, an instrument panel 190 serving as a vehicle instrument panel according to a third exemplary embodiment of the present invention is equipped with an instrument panel main body 12 and a duct configuring member 194.

The instrument panel main body 12 is configured similarly to in the first and the second exemplary embodiments of the present invention.

The duct configuring member 194 is configured by a first panel 200 disposed at the vehicle top-bottom direction top side and a second panel 202 disposed at the vehicle top-bottom direction bottom side. The external shape of the first panel 200 is smaller than the external shape of the second panel 202.

The first panel 200 and the second panel 202 are configured similarly to in the second exemplary embodiment with center air conditioning ducts 212, center defroster ducts 214, side air conditioning ducts 216 and side defroster ducts 218.

Specifically, the bottom side second panel 202 is formed with bottom side wall sections 212B configuring the center air conditioning ducts 212 with hat shaped cross-sections open towards the top, second wall sections 214B configuring part of the vehicle front-rear direction front side of the center defroster duct 214, the side air conditioning ducts 216 with hat shaped cross-sections open towards the top (the instrument panel main body 12 side), and side defroster duct upstream sections 218A that configure the upstream side of the side defroster ducts 218 with hat shaped cross-sections open towards the top.

The top side first panel 200 is formed with top side wall sections 212A of hat shaped cross-section open towards the bottom and configuring the center air conditioning ducts 212 together with the bottom side wall sections 212B, first wall sections 214A configuring part of the vehicle front-rear direction rear side of the center defroster ducts 214 together with the second wall sections 214B, and sheet sections 268 that close off the openings of the side air conditioning ducts 216 and the side defroster duct upstream sections 218A on the instrument panel main body 12 side. The sheet sections 268 are formed with shallow depth indentations that form protrusions facing downwards, and preferably form thermal insulation spaces between the sheet sections 268 and the back face of the instrument panel main body 12.

The first panel 200 and the second panel 202 are joined in a mutually superimposed state to the back face of the instrument panel main body 12, such as by welding. However, joining to the back face of the instrument panel main body 12 is performed at the peripheral edge portion of the second panel 202 at a region where the external profile of the first panel 200 is small.

Figure 13:
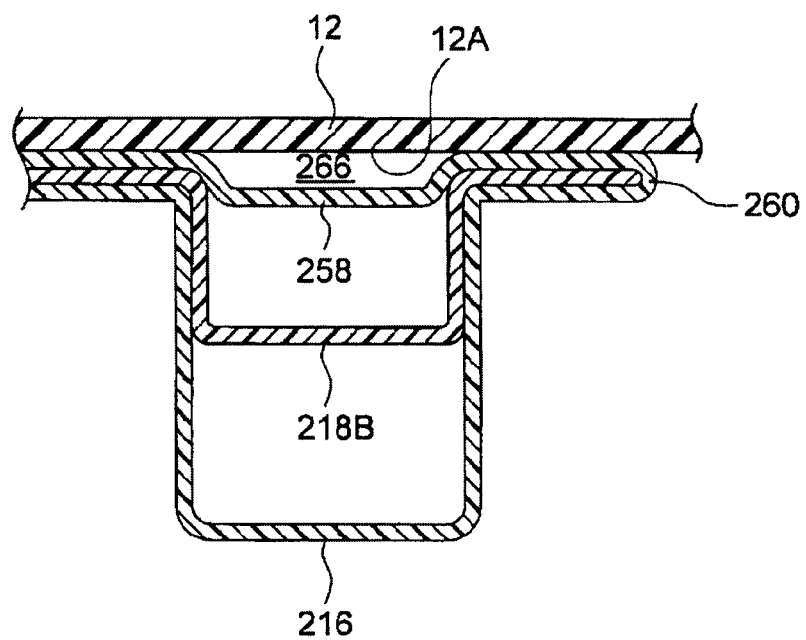
FIG. 13 is an enlarged cross-section of relevant portions of the instrument panel illustrated in FIG. 12, taken on line 13-13.

In addition, side defroster duct downstream sections 218B are formed at locations to the two vehicle width direction sides of the first panel 200. The side defroster duct downstream sections 218B are formed extending along the peripheral edge portion of the first panel 200 to form protrusions towards the inside of the side air conditioning ducts 216 and have hat shaped cross-sections open towards the top. Corresponding side defroster duct top side wall sections 258 are integrally formed on the other side of integral hinges 260 at the vehicle width direction outside of the side air conditioning duct 216 in the second panel 202. The side defroster duct top side wall sections 258 are formed with hat shaped cross-sections that are shallower than the side defroster duct downstream sections 218B. As shown in FIG. 13, when the side defroster duct top side wall sections 258 are in an assembled state to a vehicle, insulation spaces 266 are formed between the side defroster duct top side wall sections 258 and the back face 12A of the instrument panel main body 12.

As shown in FIG. 13, the side defroster duct downstream sections 218B are superimposed in the top-bottom direction inside the side air conditioning ducts 216 of the second panel 202. The side defroster duct top side wall sections 258 then fold back about the integral hinges 260, such that the side defroster duct downstream sections 218B are sandwiched between the side air conditioning ducts 216 and the side defroster duct top side wall sections 258. The side air conditioning ducts 216, the side defroster duct downstream sections 218B and the side defroster duct top side wall sections 258 that have been superimposed in the top-bottom direction are then joined to the back face 12A of the instrument panel main body 12 at the joining face where superimposed on each other.

Configuration may be understood that, the first panel 200 is configured such that, in the first panel 30 of the first exemplary embodiment described above, the peripheral edge portion of the first panel 30 extends along and covers the top of the side air conditioning ducts 216 and the side defroster duct upstream sections 218A, and is joined to the second panel 202.

Explanation follows regarding operation and advantageous effects of the third exemplary embodiment of the present invention that differ from those of the first exemplary embodiment and second exemplary embodiment.

According to the instrument panel 190, the side air conditioning ducts 216 and the side defroster duct downstream sections 218B are formed side-by-side in the vehicle top-bottom direction by the peripheral edge portion extending out from the first panel 200. There is accordingly no restriction imposed on the placement of the side air conditioning outlets 26 and the side defroster outlets 28, enabling a structure to be achieved in which the side air conditioning ducts 216 and the side defroster ducts 218 are integrated together using a simple configuration.

The openings of the side air conditioning ducts 216 and the side defroster duct upstream sections 218A on the instrument panel main body 12 side are closed off by the sheet sections 268. Consequently, even when cooled air flows through inside the side air conditioning ducts 216 and the side defroster ducts 218, condensation can be suppressed from developing on the front face of the instrument panel main body 12 corresponding to the side air conditioning ducts 216 and the side defroster duct upstream sections 218A since the cooled air does not make direct contact with the back face of the instrument panel main body 12.

The openings in the side defroster duct downstream sections 218B on the instrument panel main body 12 side are also closed off by the side defroster duct top side wall sections 258. Consequently, even when cooled air flows through inside the side defroster ducts 218, condensation can be suppressed from developing on the front face of the instrument panel main body 12 corresponding to the side defroster duct downstream sections 218B since the cooled air does not make direct contact with the back face of the instrument panel main body 12.

Note that in the third exemplary embodiment of the present invention, reinforcement sections may be formed at the first panel 200 and the second panel 202 with plural protrusion portions similar to those of the first and the second exemplary embodiments as described above (see FIG. 1, FIG. 7 and FIG. 8).

Explanation has been given above of exemplary embodiments of the present invention, however the present invention is not limited thereto, and naturally various other modifications can be implemented within a range not departing from the spirit of the present invention.

The invention claimed is:

1. A vehicle instrument panel comprising:
an instrument panel main body that covers a vehicle structural body including an air conditioner device from the vehicle top-bottom direction top side, and is formed with an air conditioning outlet and a defroster outlet;
a first panel disposed at the vehicle top-bottom direction bottom side of the instrument panel main body, joined to the instrument panel main body, and formed with a top side wall section that configures a vehicle top-bottom direction top side of an air conditioning duct that communicates an air feed outlet of the air conditioner device with the air conditioning outlet and a first wall section that configures part of a defroster duct that communicates the air feed outlet of the air conditioner device with the defroster outlet; and
a second panel disposed at the vehicle top-bottom direction bottom side of the first panel, joined to the instrument panel main body, and formed with a bottom side wall section that configures the air conditioning duct in combination with the top side wall section and a second wall section that configures the defroster duct in combination with the first wall section,
wherein:
side air conditioning outlets and side defroster outlets are formed in a row in the vehicle top-bottom direction at the two vehicle width direction end sides of the instrument panel main body; and
the second panel is formed with side air conditioning ducts that communicate an air feed outlet of the air conditioner device with the respective side air conditioning outlets; side defroster duct upstream sections that configure the upstream side of side defroster ducts that communicate the air feed outlet of the air conditioner device with the respective side defroster outlets; and side defroster duct downstream sections that are in communication with the respective side defroster duct upstream sections and configure the downstream side of the respective side defroster ducts, wherein the side defroster duct downstream sections are integrally formed at the vehicle width direction outside of the side air conditioning ducts with integral hinges being provided between the side air conditioning ducts and the side defroster duct downstream sections, the side defroster duct downstream sections are folded back about the integral hinges so as to be superimposed with the side air conditioning ducts, and, in a vehicle top-bottom direction superimposed state with the side air conditioning ducts, the side defroster duct downstream sections are joined together with the side air conditioning ducts to the back face of the instrument panel main body.

2. A vehicle instrument panel comprising:
an instrument panel main body that covers a vehicle structural body including an air conditioner device from the vehicle top-bottom direction top side, and is formed with an air conditioning outlet and a defroster outlet;
a first panel disposed at the vehicle top-bottom direction bottom side of the instrument panel main body, joined to the instrument panel main body, and formed with a top side wall section that configures a vehicle top-bottom direction top side of an air conditioning duct that communicates an air feed outlet of the air conditioner device with the air conditioning outlet and a first wall section that configures part of a defroster duct that communicates the air feed outlet of the air conditioner device with the defroster outlet; and
a second panel disposed at the vehicle top-bottom direction bottom side of the first panel, joined to the instrument panel main body, and formed with a bottom side wall section that configures the air conditioning duct in combination with the top side wall section and a second wall section that configures the defroster duct in combination with the first wall section,
wherein:
side air conditioning outlets and side defroster outlets are formed in a row in the vehicle top-bottom direction at the two vehicle width direction end sides of the instrument panel main body,
the second panel is formed with side air conditioning ducts that communicate an air feed outlet of the air conditioner device with the respective side air conditioning outlets, and side defroster ducts that communicate the air feed outlet of the air conditioner device with the side defroster outlets, the side air conditioning ducts and the side defroster ducts are respectively formed with U shaped cross-sections open to the instrument panel main body side;
the vehicle instrument panel further comprises a sheet member that closes off the openings at the instrument panel main body side of the side air conditioning ducts and the side defroster ducts; and
the bottom wall of the side defroster duct forms a top wall of the side air conditioning duct.

3. A vehicle instrument panel comprising:
an instrument panel main body that covers a vehicle structural body including an air conditioner device from the vehicle top-bottom direction top side, and is formed with an air conditioning outlet and a defroster outlet;

a first panel disposed at the vehicle top-bottom direction bottom side of the instrument panel main body, joined to the instrument panel main body, and formed with a top side wall section that configures a vehicle top-bottom direction top side of an air conditioning duct that communicates an air feed outlet of the air conditioner device with the air conditioning outlet and a first wall section that configures part of a defroster duct that communicates the air feed outlet of the air conditioner device with the defroster outlet; and a second panel disposed at the vehicle top-bottom direction bottom side of the first panel, joined to the instrument panel main body, and formed with a bottom side wall section that configures the air conditioning duct in combination with the top side wall section and a second wall section that configures the defroster duct in combination with the first wall section, wherein:

side air conditioning outlets and side defroster outlets are formed in a row in the vehicle top-bottom direction at the two vehicle width direction end sides of the instrument panel main body;

the second panel is formed with side air conditioning ducts that communicate an air feed outlet of the air conditioner device with the respective side air conditioning outlets, and side defroster duct upstream sections that configure the upstream side of side defroster ducts that communicate the air feed outlet of the air conditioner device with the respective side defroster outlets, and the side air conditioning ducts and the side defroster duct upstream sections are respectively formed with U shaped cross-sections open towards the instrument panel main body side; and the first panel is formed with side defroster duct downstream sections configuring the downstream side of the side defroster ducts, the side defroster duct downstream sections are formed by peripheral edge portions of the first panel that extend out and, in a vehicle top-bottom direction superimposed state with the side air conditioning ducts, the peripheral edge portions are joined together with the side air conditioning ducts to the back face of the instrument panel main body.

4. The vehicle instrument panel of claim 3, wherein the first panel is formed with a sheet section that closes off openings on the instrument panel main body side of the side air conditioning ducts and the side defroster duct upstream sections.

5. The vehicle instrument panel of claim 3 wherein:

the side defroster duct downstream sections are formed with hat shaped cross-sections open to the instrument panel main body side; and side defroster duct top side wall sections are integrally formed to the second panel at the vehicle width direction outside of the side air conditioning ducts with integral hinges being provided between the side air conditioning ducts and the side defroster duct top side wall sections, the side defroster duct top side wall sections are folded back about the integral hinges so as to be superimposed with the side defroster duct downstream sections of the first pane and, in a vehicle top-bottom direction superimposed state with the side defroster duct downstream sections, the side defroster duct top side wall sections are joined to the back face of the instrument panel main body together with the side air conditioning ducts and the side defroster duct downstream sections, closing off openings on the instrument panel main body side of the side defroster duct downstream sections.

* * * * *